July 29, 1947.  R. O. HAMILL  2,424,689
DEMAND METER
Filed June 2, 1944

INVENTOR.
Ret O. Hamill,
BY

Patented July 29, 1947

2,424,689

UNITED STATES PATENT OFFICE 2,424,689

DEMAND METER

Ret O. Hamill, Elmhurst, N. Y.

Application June 2, 1944, Serial No. 538,415

5 Claims. (Cl. 171—34)

1

The present invention relates to maximum demand meters, particularly of the integrating type.

It has been the general practice heretofore in maximum demand meters of the integrating type to have the current measuring or load responsive integrating apparatus of the meter supply the necessary torque for advancing the maximum demand pointer forwardly to its different positions of demand indication. While the torque required for advancing this pointer is relatively small, nevertheless it constitutes a varying load which can cause objectionable error in the meter operation.

The principal feature of the present invention is to provide separate and improved means for supplying the torque necessary to advance the maximum demand pointer to its different forward positions of demand indication, whereby this torque load with its frequent variations is taken entirely off the load responsive integrating mechanism of the meter. The load responsive integrating mechanism of the meter still retains control of the advancing motion of the demand pointer, but without having to supply the torque necessary to cause that advancing motion. In the preferred embodiment of my invention herein shown, the torque or driving energy for driving the demand pointer in its forward direction is received from a unique form of energy storing means in which energy is automatically and periodically stored by the interval timing mechanism which automatically predetermines the demand interval. This interval timing mechanism is usually arranged to measure off demand intervals of 15, 30, or 60 minutes, at which time the pusher member acting on the demand pointer is set back to a predetermined initial position. In my improved construction of meter, this interval timing mechanism is caused to perform the additional function of storing energy in the energy storing means each time that the pusher member is set back to its zero position, which energy is thereafter available in the ensuing interval for imparting driving torque to the maximum demand pointer, under the control of the load responsive integrating mechanism.

My improved meter also includes an accumulative register on which the demand indications or measurements are accumulatively registered. The torque for actuating this accumulative register is obtained from the periodic resetting operation which the meter reader or inspector manually performs each time that he reads the meter, usually once a month. In this resetting operation, he manually sets the maximum demand

2 pointer back to its zero position, and the manual performance of this operation is arranged to set up the last maximum demand measurements accumulatively on the aforesaid register.

Other features, objects, and advantages of the invention will appear from the following detailed description of certain preferred embodiments thereof. In the accompanying drawings illustrating such embodiments:

Figure 2:
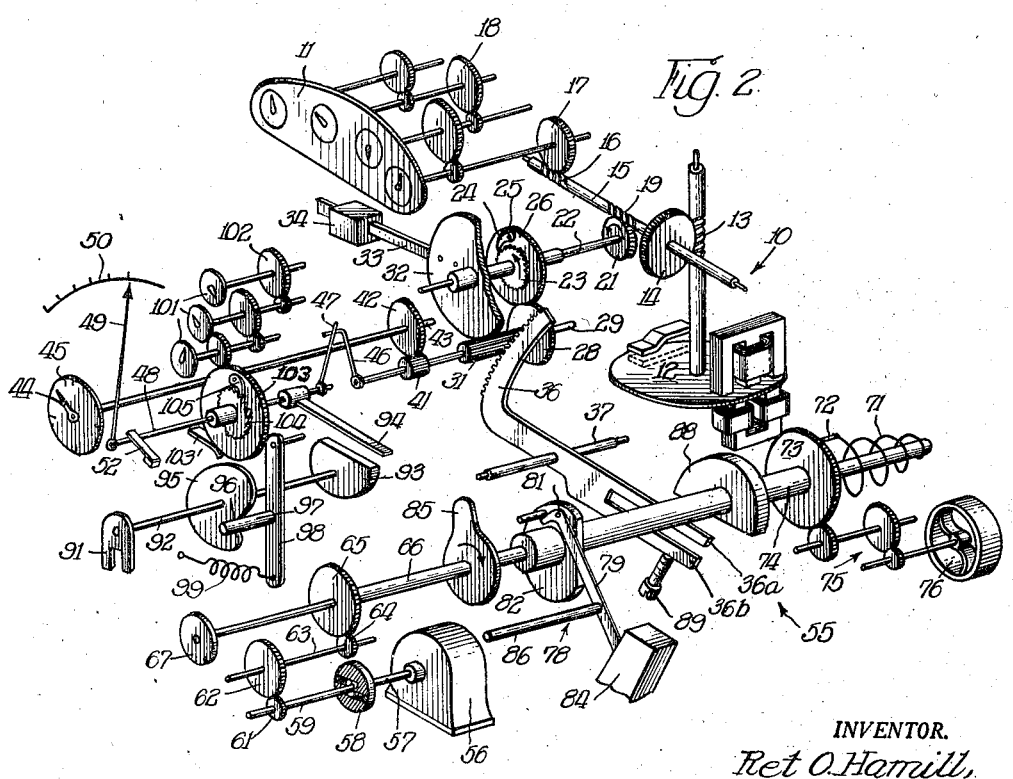
Figure 2 is an exploded perspective view of that portion of the meter mechanism having to do with the present invention.

Referring to Figure 2, 10 represents a conventional meter, such as a watthour meter, the integrations of which are registered on a dial 11, this meter constituting a load responsive means which responds to the electrical load prevailing in the circuit to which the meter is connected. The meter disc 12 drives the worm spindle 13 which meshes with a worm wheel 14 mounted on a transverse shaft 15. A worm 16 on shaft 15 drives worm wheel 17 which connects with the multiple pointer dial 11, the several pointers of this dial being interconnected by appropriate gearing 18.

Referring now to the demand mechanism of the meter, with which the invention is directly concerned, a second worm 19 on the transverse shaft 15 drives worm wheel 21 which drives a shaft 22 leading to the demand indicating mechanism. Rigidly secured to the shaft 22 is a ratchet wheel 23 which rotates at all times with the shaft 22 in the counterclockwise direction indicated by the arrow, this ratchet wheel rotating proportionately faster for a higher speed of operation of the load responsive meter mechanism 10, and proportionately slower for a slower speed of rotation of this meter. Engaging in the teeth of the ratchet wheel 23 is a pivoted pawl 24 pivotally mounted at 25 on the side of a gear wheel 26 and spring urged into the teeth of the ratchet wheel. The gear wheel 26 has free rotative mounting on the shaft 22 so that it is always free to rotate in a clockwise direction relatively to the ratchet wheel 23, but is only permitted to rotate in a counterclockwise direction at the speed determined and controlled by the ratchet wheel 23. Thus, this ratchet wheel 23 functions as a controlling device which rotates in a counterclockwise direction at a rate determined by the load responsive meter 10, this controlling device controlling the rate of counterclockwise rotation of the gear wheel 26. Said latter gear wheel meshes with another gear wheel 28 mounted on a parallel shaft 29. Secured to gear wheel 28 is a long pinion 31 which meshes with a relatively large gear wheel 32. Rigidly secured to this latter gear wheel 32 is an outwardly extending arm 33 to which a weight 34 is adjustably secured by any suitable arrangement of clamping screw or the like. The large gear wheel 32, arm 33, and weight 34 constitute energy storing means in which energy is automatically and periodically stored for supplying the necessary torque for imparting advancing movement to the maximum demand pointer, as I shall presently describe. The large gear wheel 32 may, for convenience, be mounted on the shaft 22, concentric of ratchet wheel 23 and gear wheel 26, although this is not necessary because the gear wheel 32 can be mounted on a separate axis at any other spot so long as it maintains constant mesh with the pinion 31. Energy is periodically restored in the energy storing apparatus 32, 33, and 34 through the instrumentality of a large radius sector gear 36 which also meshes with the pinion 31. This sector gear swings around a pivot shaft 37, and upward or clockwise motion of the sector gear operates through pinion 31 to revolve the large gear 32 in a clockwise direction for carrying the arm 34 up to an elevated position. In this energy storing rotation of the gear 32 in a clockwise direction, the other gear wheel 26 which meshes with gear wheel 28 is likewise rotated in a clockwise direction, the ratchet pawl 24 merely idling backwards over the teeth of ratchet wheel 23 in such clockwise rotation of the gear wheel 26. Upon the cessation of this energy storing motion transmitted through sector 36, the gear wheels 32 and 26 are again ready to take up rotative movement in a counterclockwise direction under the potential energy stored in the weight 34, but such counterclockwise rotation is predetermined and controlled by the rate of rotation of the ratchet wheel 23 which responds to the rate of rotation of the meter 10.

The shaft 29, which turns directly with pinion 31, carries another pinion 41 which meshes with a gear wheel 42 mounted on another shaft 43. The front end of the shaft 43 carries a pointer 44 which moves over a stationary scale 45 printed on the face of the meter register. The pointer 44 therefore indicates the extent of rotation of shaft 22 or shaft 29, and hence is a measure of the demand accumulated within any specified demand interval. Also secured to the shaft 29 is a pusher arm 46 which is operative to impart a clockwise direction of pushing motion to another pusher arm 47 mounted on a shaft 48. Secured to the front end of the shaft 48 is a maximum demand pointer 49 which moves over a maximum demand scale 50 printed on the face of the meter register. As will be later described, the sector gear 36 is actuated at the expiration of each demand interval, which demand interval is usually of 15 minutes' duration, but which may be predetermined so as to be of 30 minutes or 60 minutes' duration. This motion of the sector gear, in addition to storing energy in the energy storing means 32, 33, and 34, as previously described, swings the pusher arm 46 back to an initial position, which is predetermined by the limit of motion of the sector gear 36, as will be later described.

Hence it will be seen that the other pusher arm 47 and maximum demand pointer 49 will not move back at the expiration of each 15 minute time interval, but will remain in the position of furthest advancement during the one month resetting period, i. e., the furthest position to which the pusher arm 47 has been advanced by the pusher arm 46 over any of the 15 minute time intervals for the total monthly period upon which the maximum demands are computed. It is preferable to impose a slight friction on the maximum demand pointer shaft 48 so as to prevent any erroneous motion of the pointer 49 which might be brought about by vibration, shock, etc. This friction load is schematically represented by the spring leaf 52 bearing against the shaft 48. This friction load constitutes part of the maximum demand pointer load which I have taken off the meter apparatus 10 and transferred to the energy storing means 32, 33 and 34. I shall hereinafter describe the resetting mechanism by which the meter reader or inspector performs the monthly manual resetting operation for resetting the maximum demand pointer 49 to its zero position.

Referring now to the time interval mechanism which causes the larger sector gear 36 to be actuated back to an initial position every fifteen minutes, this mechanism is indicated at 55 in its entirety and is driven by a small synchronous electric motor 56 which is constantly driven from the alternating current circuit for accurately measuring the 15 minute time intervals. The motor 56 is connected through shaft 57 with a one-way clutch 58 which in turn is connected through shaft 59 with pinion 61. The clutch 58 is interposed in the drive merely for the purpose of facilitating testing of the mechanism. The pinion 61 meshes with a large gear 62 which is connected through shaft 63 with a pinion 64. The latter pinion meshes with a large gear 65 mounted on shaft 66, the gear ratio being such that this shaft is caused to make one complete revolution each 15 minute interval. Secured to the front end of this shaft is a rotating indicating disc 67 which has a marked periphery that rotates relatively to a stationary marker on the front of the meter register for showing at all times the approximate amount of time still remaining in any 15 minute time interval. The opposite end of the shaft 66 is connected to one end of a coiled torsion spring 71 which surrounds this end of the shaft. The other end of the spring 71 is connected at 72 to a gear 73 mounted on a long sleeve 74 through which the shaft 66 passes. The sleeve 74 is freely rotatable on the shaft 66. Gear 73 is connected through an appropriate gear train 75 with a centrifugal brake device 76 which controls the rate of rotation of sleeve 74 whenever this sleeve is permitted to rotate. It will be evident that the continuous rotation of the shaft 66—making one revolution every 15 minute interval—will store up energy in the spring 71 which is effective to cause a quick revolution of the sleeve 74 each time that this sleeve is released by the interval timing tripping mechanism 78. This tripping mechanism is old and well known in the art of demand meters, being shown and described in Witherow Patent No. 2,247,108, issued June 24, 1941. It will therefore suffice to say that such mechanism comprises a stop finger 79 which is pivotally mounted at 81 on a disc 82 carried by the sleeve 74. The stop finger 79 is arranged to strike against a stop plate 84 and normally prevent sleeve 74 and the parts carried thereby from rotating, and as a consequence spring 71 is wound up by the continuous rotation of shaft 66. However, shaft 66 has secured to it a releasing finger 85 which is arranged to strike a projection 86 extending from the finger 79 and move this stop finger off from stop plate 84. The sleeve 74 is thus released and it quickly makes one revolution under the tension of spring 71 and is stopped again in the position shown by finger 79 again coming into contact with stop plate 84. This happens once per demand interval, which has been previously described as every 15 minutes, although a longer or shorter time interval may be employed. Secured to sleeve 74, so as to rotate therewith, is a timing cam 88 which is adapted to bear against the upper arm portion 36a of sector gear 36. This sector gear also comprises a lower arm portion 36b which is adapted to be forced down into abutment against the stationary stop 89 when the lobe of the cam 88 exerts downward pressure against the arm portion 36a. There is an appreciable resiliency between the arm portions 36a and 36b so as to permit the cam 88 to wipe past the arm portion 36a in firm contact therewith while the lower arm portion 36b is held pressed against the stationary stop 89. In the normal position of the parts of interval timing mechanism 55, the flat portion of the cam 88 lies spaced substantially above the arm portion 36a, with a sufficient distance therebetween to permit the sector gear to slowly rotate in a counterclockwise direction concurrently with the advancing movement transmitted from control member 23 to pusher member 46. It will thus be seen that the sector gear 36 also takes up a position of advancement in a counterclockwise direction of rotation proportionate to the degree of advancing movement which has been imparted to the pusher member 46. Upon the expiration of the 15 minute time interval, the quick rotation of the cam 88 imparts restoring rotation in a clockwise direction to the sector gear 36, until the arm portion 36b of this sector gear strikes the stop 89. This quick restoring motion of the sector gear rotates the pusher member 46 back to its initial position (as predetermined by the adjustable stop 89), and the counterclockwise rotation of the pinion 31 and gear 28 oscillates the arm 33 and weight 34 in a clockwise direction to store energy in the weight 34 by swinging it up to a raised position. The rotation of the gear wheel 26 in a clockwise direction simultaneously therewith merely carries the pawl 24 back over successive ratchet teeth of the ratchet wheel 23. The gear ratios between worms 13 and 19 and their respective worm wheels 14 and 21 are preferably such that reverse torque cannot be transmitted back to the rotating disc of the meter. It will be seen from the foregoing that upon the expiration of the 15 minute time interval which is measured by the synchronous motor 56, the pusher member 46 is restored to its initial position and potential energy is restored to the energy storing system 32, 33, 34, this potential energy being derived entirely from the synchronous motor 56.

Referring now to the manual resetting mechanism which the meter attendant actuates to reset the maximum demand pointer in his monthly examination of the meter readings, this mechanism comprises a resetting lever or lug 91 which is accessible from the front of the meter and which can be sealed in its reset position by an appropriate seal after the meter readings have been recorded. This resetting arm 91 is mounted on a shaft 92 which carries a resetting cam 93 at its inner end. This resetting cam normally occupies the position illustrated, but upon rotative resetting movement being imparted to the shaft 92 this cam is adapted to exert upward pressure against an arm 94 projecting from the shaft 48. Such motion imparted to the latter arm rotates the pusher arm 47 and maximum demand pointer 49 back to their zero positions. The resetting movement of the pusher arm 47 carries the other pusher arm 46 back along with it so that in this monthly resetting operation the pinion 31 is also rotated in a direction serving to swing the weight 34 back up to its original energy storing position. The limit of backward motion of the pusher arm 46 can also serve to limit the resetting motion of the pusher arm 47, the resetting arm 94 having adequate resiliency to permit the cam 93 to wipe past this arm in contact therewith after the pusher arm 47 has reached the limit of its resetting movement. The reset position of the resetting member 91 is indicated by an indexing cam 95 which rotates with the shaft 92 and has a recess 96 for cooperating with an indexing pin or roller 97. The indexing pin or roller is carried on a swinging arm 98 which is biased toward the cam by a spring 99 whereby the pin or roller 97 is yieldingly forced into the cavity 96 to indicate the indexing point of the resetting member 91.

Referring now to the accumulative register on which the demand indications or measurements are accumulatively registered, this mechanism comprises a set of accumulating dials 101 all appropriately geared together by the gearing 102. Motion is imparted to this gearing through a gear wheel 103 which is mounted on the shaft 48. The wheel 103 is freely rotatable in its mounting on the shaft, although it may be desirable to provide a friction device 103' or one-way ratchet to prevent the wheel turning freely in a clockwise direction. This gear wheel is adapted to be driven from the shaft in a counterclockwise direction only when the shaft is rotated backwardly in a resetting operation. This is accomplished by a ratchet wheel 104 which is fixedly secured to the shaft 48, and with which engages a ratchet pawl 105 mounted on the gear wheel 103, the direction of the ratchet teeth and pawl being such that when the shaft 48 rotates in a clockwise direction the ratchet wheel 104 merely idles past the pawl 105, but when the shaft 48 is rotated in a counterclockwise direction in the monthly resetting operation, such rotation of the ratchet wheel 104 operates through the pawl 105 to carry the gear wheel 103 directly with the shaft. It will be understood that the extent of rotary motion transmitted through gear wheel 103 to the dials 101 will be dependent upon the degree of counterclockwise motion which must be imparted to the shaft 48 for carrying the maximum demand pointer 49 back to zero position. Thus, this degree of rotation measures the degree of motion transmitted to the accumulative register dials 101.

Figure 1:
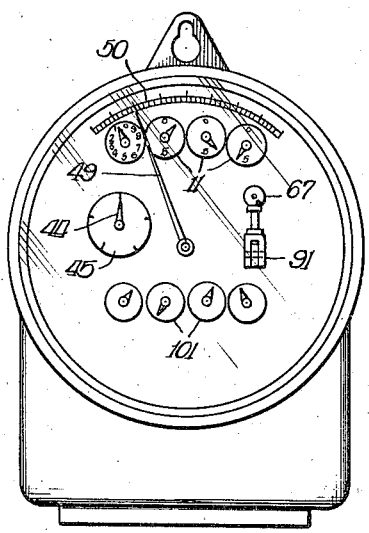
Figure 1 is a front elevational view of the improved meter.
Figure 3:
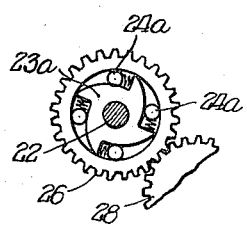
Figure 3 is a detail view showing a modified form of drive clutch for connecting with the energy storing mechanism.

Because of the desirability of minimizing the back lash between the control member 23 and the gear wheel 26, it may be desirable to substitute a ball type or roller type of one-way clutch in lieu of the ratchet clutch shown in Figure 2. In Figure 3 I have illustrated such a modification, wherein the member 23a constitutes the inner member of the ball clutch which is adapted to be clutched to the gear wheel 26 through the medium of the clutching balls or rollers 24a instead of through the medium of a ratchet pawl 24. In such ball clutch, the inner member 23a constitutes a control member responsive to the meter 10 in the same manner that the ratchet wheel 23 of the ratchet clutch constituted the control member responsive to the meter 10. The ball clutch minimizes the back lash or lag occurring between the member 23a and gear wheel 26.

In another modified embodiment of the invention, I may employ a friction slippage clutch in lieu of either the ratchet clutch 23, 24 or the ball clutch 23a, 24a. For example, a slip friction clutch may be employed similar to the slip friction clutch designated 23 in Witherow Patent No. 2,247,108 to provide the desired clutching relation between shaft 22 and gear wheel 26 such as will enable the gear wheel 26 to be rotated backwardly relatively to the shaft 22 in restoring the weight 34 back to its energy storing position. The spring loading on such friction clutch would be adjusted so that it would slip under the torque transmitted from cam 88 through sector gear 36 but would not slip under the torque imposed by the weight 34.

In each of these embodiments, the weight 34 preferably swings through a moderately narrow vertical portion of the arc of movement of arm 33 so that there is no great change in the degree of driving torque transmitted from this weight to the demand pointer 49.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a maximum demand electric meter, the combination of load responsive meter means comprising a rotary control member adapted to have uni-directional rotation at speeds which are proportional to the load demand, a maximum demand indicator, a one-way pusher connection through which said demand indicator is adapted to be advanced, an energy storing weight movable between two vertically spaced positions, means connecting said weight with said pusher connection whereby downward movement of said weight is operative to transmit advancing torque to said demand indicator under the control of said rotary control member, a clutch connection interposed between said weight and said rotary control member, whereby said weight can be moved upwardly to its upper position without causing reverse rotation of said rotary control member, interval timing mechanism comprising a continuously operating synchronous motor, means operative automatically to transmit energy from said synchronous motor to said weight for automatically restoring said weight to its raised position at predetermined regular time intervals, and resetting means for periodically resetting said maximum demand indicator to zero position.

2. In a maximum demand electric meter, the combination of load responsive meter means comprising a rotary control member adapted to rotate at a speed proportional to the load demand, a maximum demand indicator, resetting means for periodically resetting said maximum demand indicator, an energy storing weight movable between two vertically spaced positions, a one-way pusher connection between said weight and said maximum demand indicator whereby downward movement of said weight is operative to advance said maximum demand indicator under the control of said rotary control member and whereby said weight is free to move upwardly without causing retractive movement of said maximum demand indicator, interval timing mechanism comprising a continuously operating synchronous electric motor, an energy storing spring adapted to be wound by said synchronous motor, means for tripping said energy storing spring automatically at the expiration of predetermined time intervals, means for thereupon transmitting stored energy from said spring to said weight for automatically causing said weight to be restored to its elevated position, and pawl and ratchet clutch mechanism interposed between said weight and said rotary control member whereby said weight can be restored to its elevated position without causing reverse rotation of said rotary control member.

3. In a maximum demand electric meter, the combination of load responsive meter means comprising a rotary control member adapted to rotate at a speed proportional to the load demand, a maximum demand indicator, resetting means for periodically resetting said maximum demand indicator, an energy storing weight movable between two vertically spaced positions, a one-way pusher connection between said weight and said maximum demand indicator whereby downward movement of said weight is operative to advance said maximum demand indicator under the control of said rotary control member and whereby said weight is free to move upwardly without causing retractive movement of said maximum demand indicator, interval timing mechanism for automatically measuring maximum demand intervals and for automatically causing said weight to be restored to its elevated position comprising a continuously operating synchronous motor, an energy storing spring adapted to be wound by said synchronous motor, means responsive to said interval timing mechanism to transmit energy from said spring for restoring said pusher connection to an initial position and for restoring said weight to its elevated position, and an overrunning ball clutch connection interposed between said weight and said rotary control member whereby said weight can be restored to its elevated position without causing reverse rotation of said rotary control member.

4. In a maximum demand electric meter, the combination of load responsive meter means comprising a rotary control member adapted to rotate uni-directionally at a speed proportional to the load demand, a maximum demand indicator, an energy storing weight, a one-way pusher connection between said energy storing weight and said maximum demand indicator, a clutch connection between said rotary control member and said energy storing weight whereby said energy storing weight can transmit advancing torque to said maximum demand indicator under the regulating control of said rotary control member, interval timing mechanism for automatically measuring maximum demand intervals comprising a continuously operating synchronous motor, an energy storing spring adapted to be wound by said synchronous motor, means responsive to said interval timing mechanism to transmit energy from said spring for restoring said pusher connection to an initial position and for restoring energy to said energy storing weight, resetting means for periodically resetting said maximum demand indicator, a register for accumulating the maximum demands over a plurality of said periodic resetting operations, and means responsive to the actuation of said resetting means for advancing said register to a degree dependent upon the degree of resetting movement which said resetting means must impart to said maximum demand indicator to bring said indicator back to its zero position.

5. In a maximum demand electric meter, the combination of load responsive meter means comprising a rotary control shaft adapted to have uni-directional rotation in a predetermined direction at speeds which are proportional to the load demand, a first gear associated with said control shaft and capable of rotation in either direction, a one-way driving device operatively connected between said control shaft and said first gear preventing said first gear from rotating in said predetermined direction at a higher rate of speed than said control shaft while also permitting said first gear to be rotated in a reverse direction to that of said predetermined direction, a second gear meshing with said first gear, a pinion rotating with said second gear, a large gear meshing with said pinion, an arm connected with said large gear to move concurrently therewith, a weight carried by said arm to be swung by said arm between two vertically spaced positions, a maximum demand indicator, resetting means for periodically resetting said maximum demand indicator, a one-way pusher connection between said pinion and said maximum demand indicator whereby downward movement of said weight is operative to advance said maximum demand indicator under the control of said rotary control shaft and whereby said weight is free to be swung upwardly without causing retractive movement of said maximum demand indicator, interval timing mechanism for automatically measuring maximum demand intervals comprising a continuously operating synchronous motor, an energy storing spring adapted to be wound by said synchronous motor, a restoring sector meshing with said pinion, and means responsive to said interval timing mechanism to transmit energy from said spring to said restoring sector whereby to restore said pusher connection to an initial position and to restore said weight to its elevated position.

RET O. HAMILL.

REFERENCES CITED

The following references are of record in the file of this patent:

UNITED STATES PATENTS

| Number | Name | Date |
|---|---|---|
| 2,247,108 | Witherow | June 24, 1941 |
| 1,922,071 | Bassett | Aug. 15, 1933 |
| 1,759,396 | Granberg | May 20, 1930 |
| 1,125,312 | Hall | Jan. 19, 1915 |